Nov. 19, 1935.    T. L. HARRISON ET AL    2,021,508
AUTOMOBILE AUTOMATIC BACKSTOP BRAKE
Filed June 9, 1933
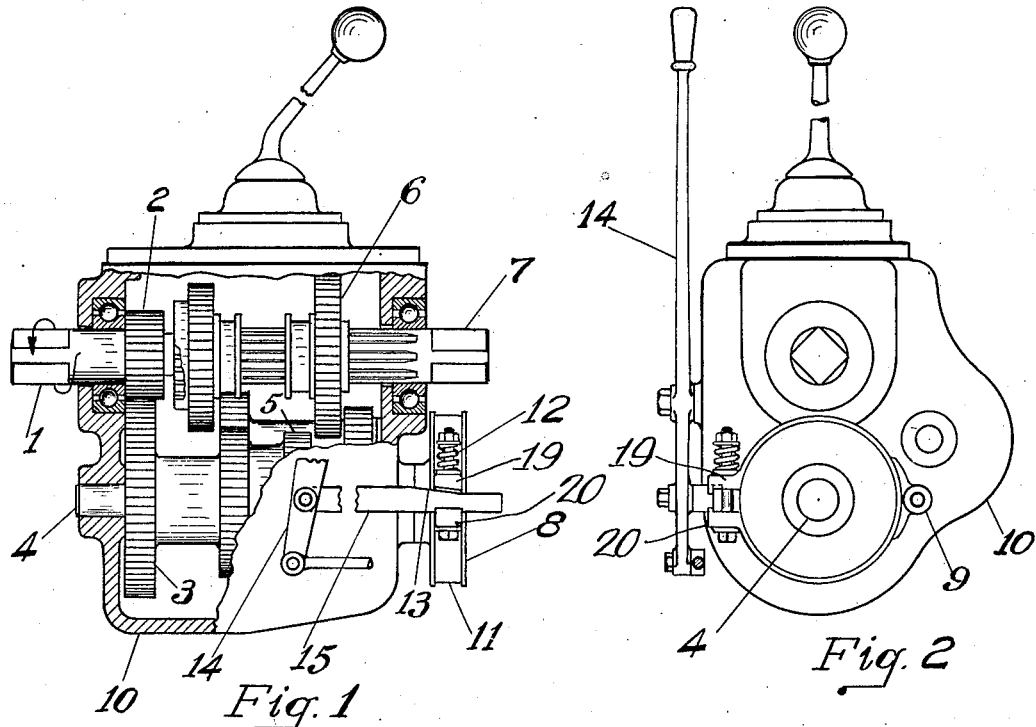
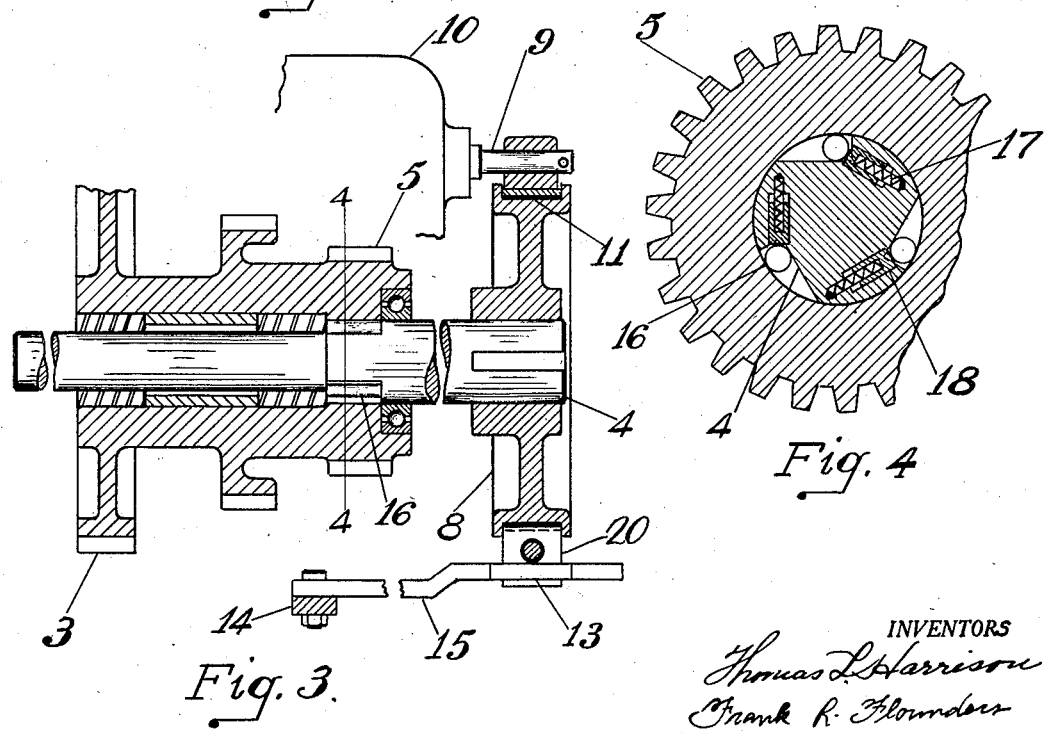
INVENTORS
Thomas L. Harrison
Frank R. Flounders
ATTORNEY.

Patented Nov. 19, 1935

2,021,508

UNITED STATES PATENT OFFICE 2,021,508

AUTOMOBILE AUTOMATIC BACKSTOP BRAKE

Thomas L. Harrison, Philadelphia, and Frank R. Flounders, Elkins Park, Pa.

Application June 9, 1933, Serial No. 674,979

1 Claim. (Cl. 192—4)

Our invention relates to an improvement for power transmission systems and refers specifically to elective limitation of the direction of rotation of gears and shafts in driving mechanisms. It has been particularly designed for use in automotive vehicles.

The principal object of this invention is to provide an automatic back stop, i. e. a safety device for preventing an automotive vehicle from rolling backward, which is adapted to be made inoperative at the will of the driver. In this connection it is planned that the invention shall provide means to permit the accomplishment of rearward movement of the vehicle in the emergency that the vehicle has come to rest against an immovable object, or in the manipulation of the vehicle in a congested area, i. e. to make the back stop "unjamable".

Another object of the invention is to provide means whereby an automotive vehicle may always be brought into forward motion from rest and without objectionable shocks.

A further object is the accomplishment of these and other aims without radical departure from conventional design.

Other objects and advantages will be presently disclosed or obvious from the description following.

In the drawing:

Fig. 1 is a side elevation and part sectional view of an automotive vehicle variable speed transmission mechanism and casing, showing a supporting countershaft with locking means, embodying part of our invention.

Fig. 2 is a rear elevation looking toward the left at Fig. 1.

Fig. 3 is an enlarged view of countershaft gears in section showing their supporting countershaft with a locking device which embodies part of our invention.

Fig. 4 is an enlarged section on line 4—4 looking toward the left in Fig. 3, showing a one-way clutch device for clamping a countershaft gear to its rotatably mounted supporting countershaft, and showing means for pressing a plurality of rollers outwardly to insure clamping, and embodying part of our invention.

Referring to the several figures of the drawing, numeral 1 represents the conventional clutch shaft or main drive shaft, which always rotates in the direction indicated by the arrow. The constant drive pinion 2 is integral with shaft 1. A countershaft gear 3 is operated through gear 2, and is rotatably mounted on the rotatably mounted countershaft 4. Gear 5, also rotatably mounted on countershaft 4 is driven by the hub of gear 3.

Referring to Figs. 3 and 4, the countershaft 4 in the part of the invention shown here is provided with a "roller clutch", or a so-called "one-way clutch", which is placed within the hub of gear 5 and limits the direction of rotation of gear 5 with respect to shaft 4 to that direction of rotation in which said gear 5 normally drives gear 6.

The "one-way clutch" shown in Fig. 4 consists of a plurality of rollers 16, carried in angular grooves in a rotatably mounted shaft 4. Positive coaction between the internal hub surface of gear 5, rollers 16, and the surfaces of the angular grooves is obtained by springs 17 carried in hollow plungers 18 which are adapted to press rollers 16 outwardly into locking contact with said internal hub surface of gear 5 and the surfaces of the angular grooves in rotatably mounted shaft 4.

The main driven shaft 7 is connected to the rear axle in the usual manner and supported at its front end free to turn in a bushing in gear 2. Gear 6 is a driven gear suitably mounted on main driven shaft 7 to be adapted to drive said shaft when said gear 6 has been selectively mated with driving gear 5 by slidable engagement or other means.

Means for locking shaft 4 from rotation show drum 8 which is keyed to shaft 4, anchor stud 9 in housing 10, and band 11 activated by spring 12 acting upon lug 19. Means for loosening band 11 through its integral lugs 19 and 20 from locking action comprise cam 13 actuated by parking brake handle 14 through linkage 15.

This linkage is adapted to actuate cam 13 by slight movement of brake lever 14 from its normal "off" position.

The invention operates as follows in an automotive vehicle. Gear 2 is driven by the engine through the usual clutch mechanism always in the same direction of rotation, and in turn always drives in the same direction of rotation gear 3 and gear 5, both of which are rotatably mounted on shaft 4, which is itself rotatably mounted in transmission casing 10. When selectively engaged with driven gear 6, driving gear 5 will move the vehicle forward through driven gear 6 and main driven shaft 7. Backward movement of the vehicle with gears 5 and 6 engaged would rotate said gears 5 and 6 in reverse direction, but initial reverse rotation of gear 5 will clamp said gear 5 to its normally locked supporting shaft 4 and so prevent backward movement of the vehicle.

However, under this condition, should backward movement of the vehicle be desirable, slight movement of the parking brake handle 14 from its usual "off" position is adapted to actuate cam 13, loosen band 11 through integral lugs 19 and 20, and permit reverse rotation of gear 5 and shaft 4 as one unit, until such time as the parking brake handle is returned to its usual "off" position. This movement of the parking brake handle is designed to be made in the opposite direction from the normal movement of the parking brake handle used in applying the parking brake, so that the operation of this mechanism will be independent of the operation of the parking brake itself.

While we prefer the one-way clutch shown within the hub of gear 5 in Fig. 4 and locking device for shaft 4 shown in Figs. 1, 2, and 3, it will be understood that other types of one-way clutches and locking devices will accomplish the purposes within the scope of our claim without departing from the invention, and we accordingly claim all such forms of the device to which we are entitled.

Having described our invention, we claim:

In an automobile transmission, in combination, a gear rotatable on a rotatable countershaft, rollers interposed in grooves in said countershaft between said countershaft and the internal bearing surface of said gear, pressure plungers interposed between said rollers and springs and held in recesses in said countershaft, springs interposed between said plungers and said countershaft, adapted to cause outward movement of plungers and rollers, causing said rollers to coact between the surfaces of the countershaft grooves and the internal bearing surface of the said gear to lock said gear to said countershaft upon initial reverse rotation of said gear; and a brake wheel integral with said countershaft, a brake band mounted around the peripheral surface of said brake wheel, means to cause clamping of said brake band to brake wheel, lugs integral with the ends of said brake band, a cam link interposed between said lugs and actuated by a lever to cause release of said brake band from said brake wheel; all as shown in the drawing.

THOMAS L. HARRISON.
FRANK R. FLOUNDERS.